(12) United States Patent
Schieszl

(10) Patent No.: US 9,233,335 B2
(45) Date of Patent: Jan. 12, 2016

(54) FRESH AIR LINE

(71) Applicant: Mahle International GmbH, Stuttgart (DE)

(72) Inventor: Andreas Schieszl, Ellwangen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/201,318

(22) Filed: Mar. 7, 2014

(65) Prior Publication Data

US 2014/0251144 A1  Sep. 11, 2014

(30) Foreign Application Priority Data

Mar. 8, 2013 (DE) .......... 10 2013 203 960

(51) Int. Cl.
*B01D 53/04* (2006.01)

(52) U.S. Cl.
CPC .... *B01D 53/0431* (2013.01); *B01D 2259/4566* (2013.01)

(58) Field of Classification Search
CPC .................................................. B01D 53/0431
See application file for complete search history.

(56) References Cited

U.S. PATENT DOCUMENTS

| | | | | |
|---|---|---|---|---|
| 5,069,688 A | * | 12/1991 | Wells | 95/96 |
| 5,232,479 A | * | 8/1993 | Poteau et al. | 96/131 |
| 5,716,427 A | * | 2/1998 | Andreani et al. | 95/90 |
| 5,792,247 A | * | 8/1998 | Gillingham et al. | 96/386 |
| 5,858,062 A | * | 1/1999 | McCulloh et al. | 95/8 |
| 6,152,996 A | * | 11/2000 | Linnersten et al. | 96/135 |
| 6,190,432 B1 | * | 2/2001 | Gieseke et al. | 55/385.3 |
| 6,235,192 B1 | * | 5/2001 | Melfi et al. | 210/136 |
| 6,866,700 B2 | * | 3/2005 | Amann | 95/273 |
| 7,670,396 B2 | * | 3/2010 | Hussain | 55/320 |
| 2005/0235615 A1 | * | 10/2005 | Nyman et al. | 55/350.1 |
| 2005/0262818 A1 | * | 12/2005 | Stenersen | 55/482 |
| 2007/0056442 A1 | * | 3/2007 | Bres et al. | 95/96 |
| 2007/0292816 A1 | * | 12/2007 | Miller | 432/180 |
| 2012/0304629 A1 | | 12/2012 | Metzger et al. | |

FOREIGN PATENT DOCUMENTS

| | | |
|---|---|---|
| DE | 102011104630 A1 | 12/2012 |
| EP | 2249020 A1 | 11/2010 |
| WO | WO-2012049027 A1 | 4/2012 |

* cited by examiner

*Primary Examiner* — Christopher P Jones
(74) *Attorney, Agent, or Firm* — Fishman Stewart Yamaguchi PLLC

(57) ABSTRACT

A fresh air line for a fresh air system may include a tubular body enclosing a fresh air path in a circumferential direction. At least one annular adsorber element arranged coaxially in the tubular body. The fresh air line may also include at least one resonance chamber arranged radially between the tubular body and the adsorber element.

20 Claims, 4 Drawing Sheets

FRESH AIR LINE

CROSS-REFERENCE TO RELATED APPLICATIONS

This application claims priority to German Patent Application No. 10 2013 203 960.3, filed Mar. 8, 2013, the contents of which are hereby incorporated by reference in their entirety.

TECHNICAL FIELD

The present invention relates to a fresh air line of a fresh air system for supplying combustion chambers of an internal combustion engine with fresh air, having the features of the preamble of claim 1. The invention also relates to a fresh air system equipped with such a fresh air line.

BACKGROUND

Such a fresh air line is known from WO 2012/049027 A1. It comprises a tubular body, which encloses a fresh air path in a circumferential direction, and an annular adsorber element, which is inserted coaxially into the tubular body in such a manner that the fresh air path is radially delimited by the adsorber element in the region of the adsorber element. In the known fresh air system, an annular depression can be formed on an inner side of the tubular body that faces the fresh air path in order to accommodate the annular adsorber element, which depression is dimensioned in such a manner that the adsorber element can be arranged such that it is sunk therein. In this case the adsorber element bears with the whole area of its outer side that faces the tubular body against the inner side of the tubular body inside the depression.

Such an adsorber element is preferably used for the adsorption of hydrocarbons (CHX) and is preferably used in a fresh air system for the adsorption of aromatic substances.

SUMMARY

The present invention is concerned with the problem of specifying an improved embodiment for a fresh air line of the above-mentioned type and for a fresh air system equipped therewith, which is characterised in particular by additional or extended functionality.

This problem is solved according to the invention by the subject matter of the independent claim. Advantageous embodiments form the subject matter of the dependent claims.

The invention is based on the general concept of forming at least one resonance chamber radially between the tubular body and the adsorber element. Sound waves that propagate in the fresh air line during operation of the internal combustion engine can enter the resonance chamber through the adsorber element and be damped therein by resonance effects and/or reflections and/or expansion. Such a resonance chamber preferably operates in the high-frequency range. For example, airborne sound that is generated in the fresh air system by a compressor of an exhaust turbocharger arranged therein can be damped in this manner, as a result of which sound emissions to the environment are reduced.

In order to improve the acoustic coupling between the fresh air path and the resonance chamber through the adsorber element, the adsorber element can, according to an advantageous embodiment, have at least one radial passage opening, which connects the fresh air path to the at least one resonance chamber in a communicating manner. In this manner the passage of sound through the adsorber element is greatly improved, which increases the sound-damping effect of the resonance chamber correspondingly. Such passage openings can be introduced for example by lasers, as a result of which welded opening edges are produced at the same time.

The respective passage opening can be configured to be point-shaped or hole-shaped, as a result of which the combination of resonance chamber and correspondingly perforated adsorber element forms a type of perforated resonator. It is likewise possible in principle for the passage openings to be line-shaped or slit-shaped or slot-shaped, as a result of which the combination of adsorber element and resonance chamber forms a type of slotted resonator.

In another advantageous embodiment, a plurality of resonance chambers can be provided, which bound each other axially or in the circumferential direction. In this case it is possible in principle for a plurality of resonance chambers of the same type to be provided, which bound each other for example in order to increase the sound-damping effect for a certain frequency range. It is likewise possible for at least two different resonance chambers to be provided in order to damp either two separate frequency ranges or to damp a wider frequency range.

If at least two annular resonance chambers bound each other axially, they can be covered or delimited radially on the other side by a common adsorber element. If several resonance chambers bound each other in the circumferential direction, they can be delimited radially on the inside by a common adsorber element.

According to another advantageous development, the resonance chambers can be connected in a communicating manner to the fresh air path via separate passage openings. In particular, each resonance chamber can have either only one passage opening or a plurality of its own passage openings. The frequency to be damped can be varied by means of the number of passage openings and the dimensions of the passage openings.

In another advantageous development, it can be provided for at least two resonance chambers to be adjacent in the circumferential direction and separated from each other by a radially projecting dividing ridge. A corresponding number of resonance chambers can be separated from each other in the circumferential direction by a plurality of dividing ridges, which in particular are arranged in a star-shaped manner in relation to a longitudinal axis of the tubular body and each extend preferably axially, that is, parallel to the longitudinal axis of the tubular body.

The respective dividing ridge can be formed integrally on the tubular body and project radially inwards from the inner side thereof.

The adsorber element can, according to an advantageous embodiment, have an annular cage as the carrier for an adsorber material. A single-layered or multi-layered web material, in which an adsorber medium is embedded, is for example suitable as the adsorber material. Different woven, looped or nonwoven fabrics, preferably consisting of plastic, are suitable as the web material. Carbon or activated carbon is particularly suitable as the adsorber medium. The adsorber medium can in this case be embedded in the web material preferably in the form of a free-flowing granulate. For example, the adsorber granulate can be arranged or poured between two layers of the web material, a pore size of the web material being smaller than the average grain size of the granulate. The cage is connected in a suitable manner to the adsorber material in order to position the latter in a dimensionally stable manner. For example, the cage can be produced from a plastic and in particular injection-moulded directly onto the adsorber material.

The passage openings can be realised in a web material for example by means of eyelets. An annular eyelet edge can thereby close the web material at the respective passage opening that corresponds to the respective central eyelet opening.

According to an advantageous development, it can then be provided for at least one dividing ridge of the above-mentioned type to be formed integrally on the above-mentioned cage, the respective dividing ridge then projecting radially outwards on an outer side of the adsorber element.

Preferably, all the dividing ridges are formed either on the tubular body or on the cage. In principle, however, an embodiment is also conceivable in which at least one dividing ridge is formed on the tubular body whereas at least one other dividing ridge is formed on the cage. In this manner the radial extent of the at least two resonance chambers can be varied depending on the rotation position between the adsorber element and the tubular body, for example in order to set different frequency ranges.

In another advantageous embodiment, at least one such dividing ridge can have at least one connection opening, via which the two resonance chambers bordering the dividing ridge are connected to each other in a communicating manner. The damping effect can be adjusted thereby.

In another embodiment, the cage can be designed as an annular and/or cylindrical perforated wall. The adsorber material can thereby be supported by the cage over its area on the radial outside or inside. The cage is preferably arranged radially between the resonance chamber and the adsorber material, so the cage surrounds the adsorber material in the circumferential direction.

The perforated wall or cage thus has a plurality of radially oriented holes. These can, according to an advantageous development, align radially with the passage openings of the adsorber element, which are formed correspondingly in the adsorber material. This simplifies the passage of the airborne sound through the adsorber element.

According to another advantageous embodiment, the tubular body can have on its inner side at least one depression, in which the respective resonance chamber is situated. Owing to this design, the volume for realising the resonance chamber on the tubular body spreads out towards the outside, as a result of which the formation of a flow obstacle and an increased flow resistance in the interior fresh air path can be avoided.

According to one advantageous development, the respective adsorber element can be arranged deep in the respective depression and in particular sunk flush with the axially adjacent inner side of the tubular body. Accordingly, the tubular body has a virtually uniform inner cross section along the fresh air path, as a result of which disruptive contours and thus an increase in the flow resistance can be avoided.

In another advantageous development, the respective adsorber element in the respective depression can bear axially against an annular step of the tubular body and bear against a stop element axially opposite the annular step, which stop element is separate in relation to the tubular body and in relation to the adsorber element. This simplifies the assembly of the fresh air line, in particular the introduction of the adsorber element into the tubular body.

The separate stop element can preferably be formed by an end-face end region of a tube or tube connection piece, which is inserted axially into the tubular body. In this manner the adsorber element is automatically fixed axially in the tubular body by the incorporation of the fresh air line into the fresh air system.

A fresh air system according to the invention that is used for supplying combustion chambers of an internal combustion engine with fresh air comprises a fresh air tract, which has a fresh air filter and at least one fresh air line of the above-described type.

In another advantageous embodiment, it can be provided for the adsorber element to have a projection in the region of the respective passage opening, which projection projects into the resonance chamber and is likewise penetrated by the respective passage opening. In this manner, a radial length of the respective passage opening can be dimensioned larger than a radial wall thickness of the adsorber element. In particular, Helmholtz resonators can be realised thereby, the resonance behaviour of which depends significantly on the volume of the respective resonance chamber and on the volume of the respective passage opening.

Further important features and advantages of the invention can be found in the sub-claims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
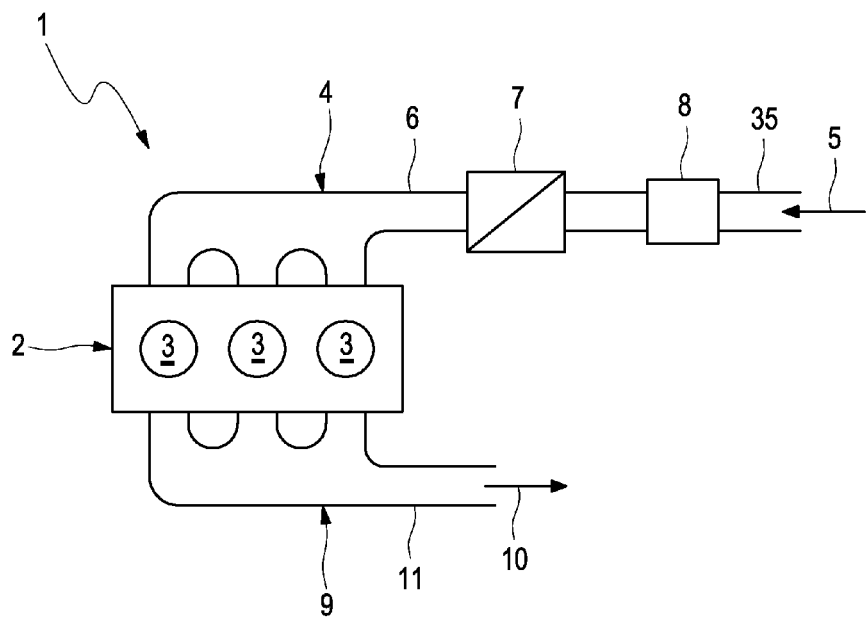
FIG. 1 schematically shows a highly simplified, circuit-diagram-like diagram of an internal combustion engine, FIG. 2 schematically shows a highly simplified, half longitudinal section through a fresh air line, FIGS. 3 and 4 each schematically show an isometric, exploded diagram of the fresh air line in other embodiments, FIGS. 5 to 8 each schematically show a partial view of a cross section of the fresh air line in different embodiments.

According to FIG. 1, an internal combustion engine 1, which is preferably used in a motor vehicle, comprises an engine block 2, which contains a plurality of combustion chambers 3. The combustion chambers 3 are usually formed by cylinders, in which pistons are arranged in a stroke-adjustable manner. A fresh air system 4 acts to supply the combustion chambers 3 with fresh air. A corresponding fresh air stream 5 is indicated with an arrow. The fresh air system 4 comprises a fresh air tract 6, in which for example a fresh air filter 7 and a fresh air line 8 are arranged. Furthermore, an exhaust system 9 is provided, which discharges exhaust gas from the combustion chambers 3. A corresponding exhaust gas stream 10 is indicated with an arrow. The exhaust system 9 has an exhaust tract 11, in which exhaust gas post-treatment devices such as catalysts and particle filters as well as silencers can be arranged in the usual manner.

According to FIGS. 2 to 9, the above-mentioned fresh air line 8 comprises a tubular body 12, which encloses a fresh air path 13 in a circumferential direction 14. The circumferential direction 14 rotates about a longitudinal centre axis 15 of the tubular body 12. The fresh air line 8 also comprises at least one annular adsorber element 16, which is arranged coaxially in the tubular body 12. The adsorber element 16 also encloses the fresh air path 13 in the circumferential direction 14. The fresh air path 13 is thus radially delimited by the adsorber element 16 in the region of the adsorber element 16. In the embodiments shown here, the adsorber element 16 is designed in one piece in the circumferential direction 14. A multi-part design, which is segmented in the circumferential direction 14 is likewise conceivable.

In the fresh air line 8 presented here, at least one resonance chamber 17 is also provided, which is formed radially between the tubular body 12 and the adsorber element 16. In the region of the resonance chamber 17 there is therefore a radial distance 18 between an outer side 19 facing the tubular body 12 and an inner side 20 of the tubular body 12 facing the adsorber element 16. This radial distance 18 is preferably at least equal to a radial wall thickness 21 of the adsorber element 16.

The adsorber element 16 preferably has a plurality of passage openings 22. The passage openings 22 lead to a communicating connection between the fresh air path 13 and the respective resonance chamber 17. Sound waves that propagate along the fresh air path 13, preferably counter to the flow direction of the fresh air stream 5, can thus enter the respective resonance chamber 17 particularly easily.

According to FIGS. 2, 3 and 7 to 9, the passage openings are expediently point-shaped or hole-shaped, as a result of which the resonance chamber 17 forms a perforated resonator together with the adsorber element 16. According to FIG. 4, the passage openings can also be linear or slit-shaped or slot-shaped, as a result of which the resonance chamber 17 forms a slotted resonator together with the adsorber element 16.

In principle, a plurality of such resonance chambers 17 can be provided. At least two resonance chambers 17 can thus bound each other axially and be covered radially on the inside by the same adsorber element 16. Additionally or alternatively, at least two resonance chambers 17 can bound each other in the circumferential direction 14, which chambers are delimited radially on the inside by the same adsorber element 16.

Figure 8:
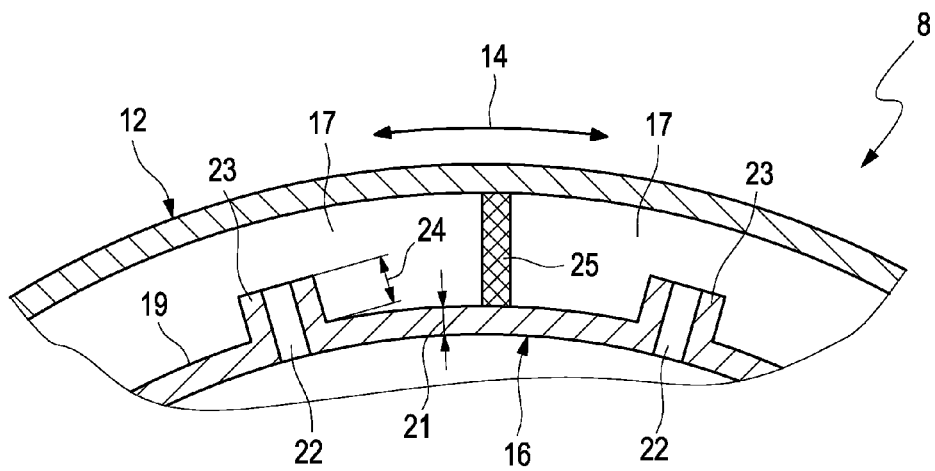

If a plurality of resonance chambers 17 is provided, they are expediently connected in a communicating manner to the fresh air path 13 via separate passage openings 22. A particular embodiment is produced if only one passage opening 22 is provided for each resonance chamber 17. In this case, an efficient Helmholtz resonator can be configured. A particular embodiment of such a Helmholtz resonator configuration is shown in FIG. 8, which is characterised in that the passage openings 22 are each led through a projection 23, which projects radially outwards on the outer side 19 of the adsorber element 16 and thus projects into the resonance chamber 17. A radial length 24 of the respective passage opening 22 can thereby be dimensioned larger than the radial wall thickness 21 of the adsorber element 16.

Figure 5:
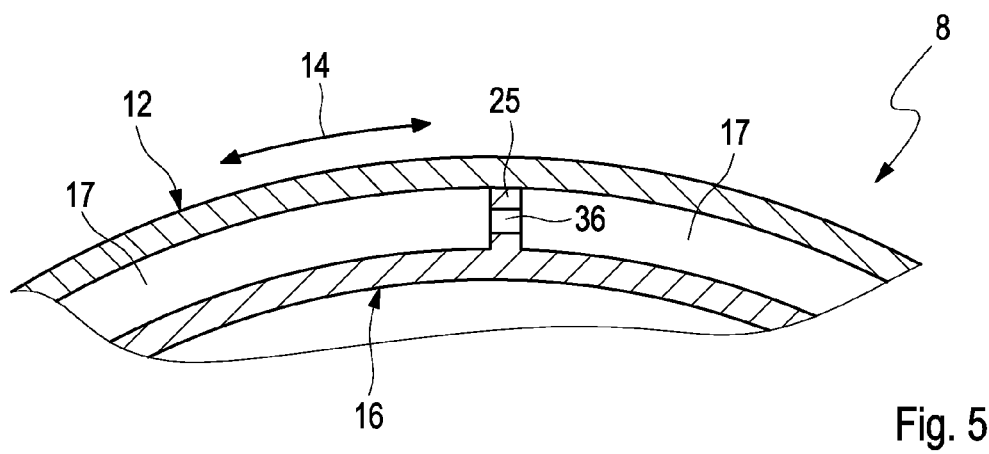
Figure 6:
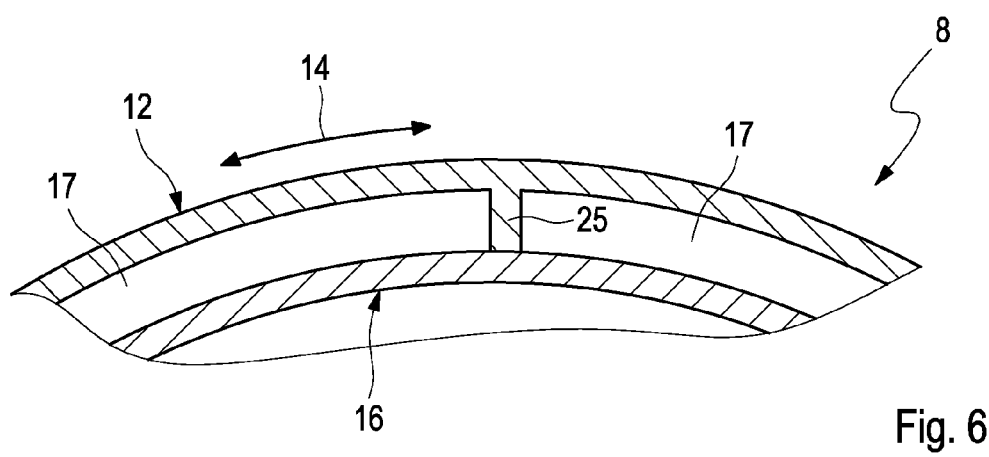
Figure 7:
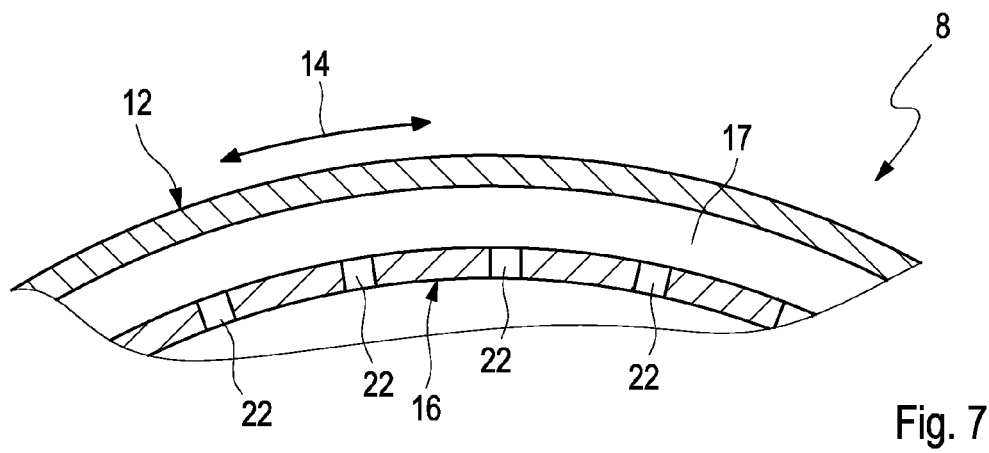

As can be seen in FIGS. 5, 6 and 8, resonance chambers 17 that are adjacent in the circumferential direction 14 can be separated from each other by a radially projecting dividing ridge 25 running axially, that is, parallel to the longitudinal centre axis 15. In the embodiment shown in FIG. 5, the respective dividing ridge 25 is formed integrally on the adsorber element 16, so that it projects radially outwards from the adsorber element 16 and is in contact radially on the outside with the inner side 20 of the tubular body 12. In the embodiment shown in FIG. 6, the respective dividing ridge 25 is however formed integrally on the tubular body 12, so that it projects radially inwards and bears with its radially inner end against the outer side 19 of the adsorber element 16. A further variation is shown in FIG. 8, where the respective dividing ridge 25 represents a separate component from the tubular body 12 and the adsorber element 16, which component is attached or installed in a suitable manner. For example, the respective dividing ridge 25 can be adhesively bonded or welded to the tubular body 12 and/or to the adsorber element 16.

According to FIG. 5, at least one such dividing ridge 25 can, irrespective of whether it projects inwards from the tubular body 12 or outwards from the adsorber element 16, have at least one connection opening 36, through which the two resonance chambers 17, which are adjacent in the circumferential direction 14 and are separated from each other by the dividing ridge 25, are connected to each other in a communicating manner.

Figure 3:
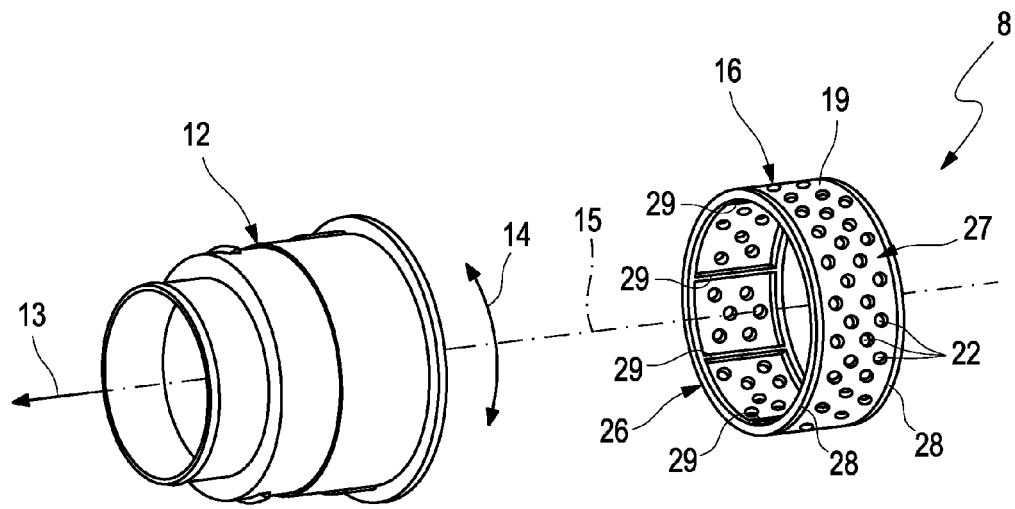
Figure 4:
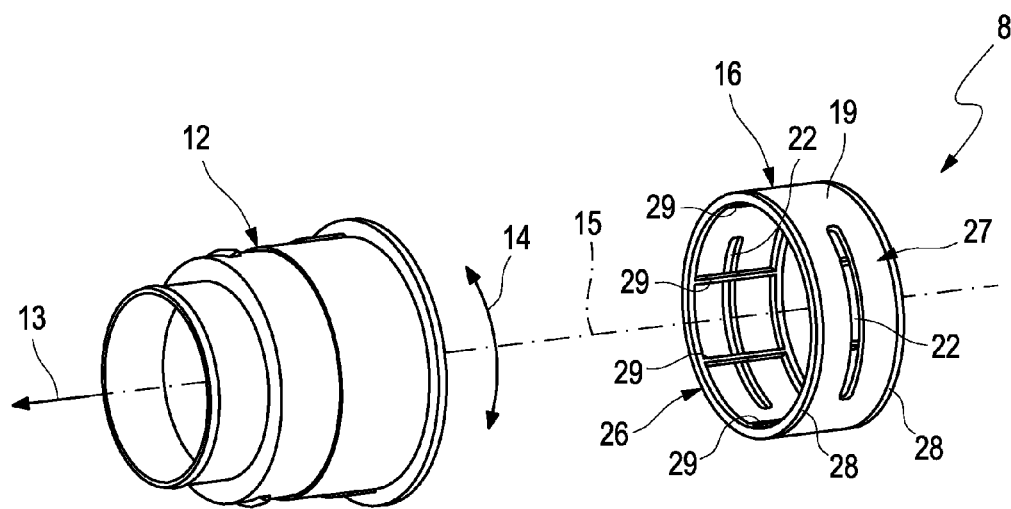

As can be seen in particular in FIGS. 3 and 4, the adsorber element 16 can have an annular cage 26 and an adsorber material 27, the cage 26 acting as a carrier for the adsorber material 27. The passage openings 22 are formed in the adsorber material 27 and penetrate the adsorber material 27. In the examples of FIGS. 3 and 4, the cage 26 has two circular rings 28, which each run around in a closed manner in the circumferential direction 14 and are spaced apart from each other in the axial direction. The two rings 28 are connected to each other by means of a plurality of axial ridges 29. The cage 26 can be injection-moulded onto the adsorber material 27. The adsorber material 27 is for example a single- or multi-layered web material, in which an adsorption medium is incorporated or embedded. In particular, the cage 26 can be injection-moulded onto the adsorber material 27 in such a manner that edge-side openings of the web material are closed by the injection-moulded plastic of the cage 26.

If the adsorber element has a dividing ridge 25, this is preferably formed integrally on the cage 26.

Figure 9:
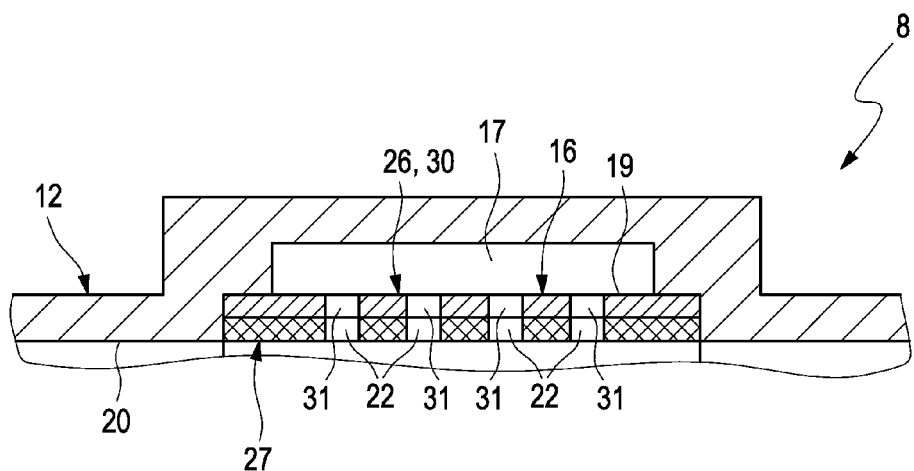
FIG. 9 shows a longitudinal section through the fresh air line as in FIG. 2, but in a different embodiment.

According to an alternative embodiment, the cage 26 can according to FIG. 9 also be configured as a perforated wall 30 and extend in an annular, closed manner in the circumferential direction 14. The perforated wall 30 contains a plurality of holes 31. In the example of FIG. 9, the cage 26 supports the adsorber material 27 on the inner side, so that the adsorber material 27 is supported radially outwardly on the cage 26 or perforated plate 30. The passage openings 22 of the adsorber material 27 expediently align radially with the holes 31 in the cage 26.

Figure 2:
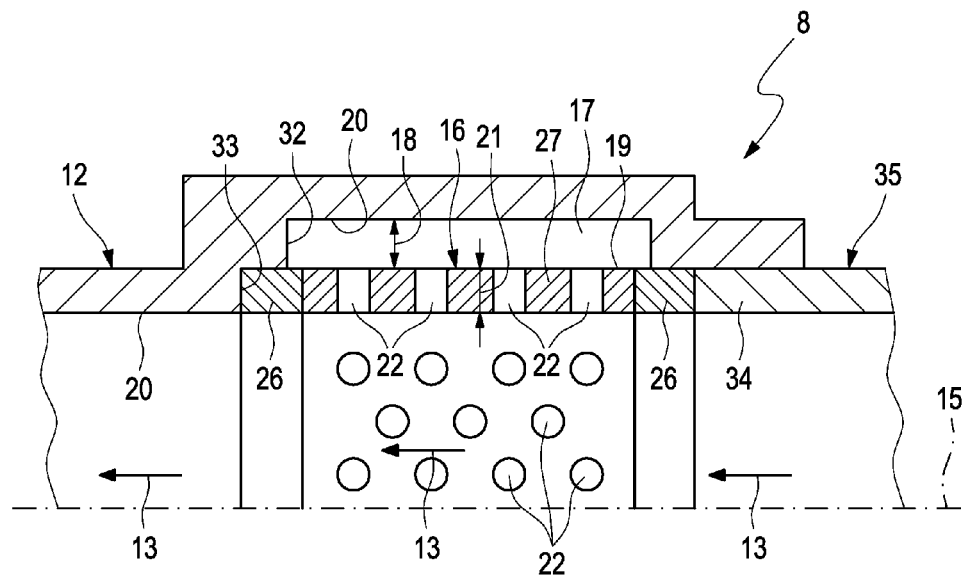

According to FIGS. 2 and 9, the tubular body 12 can have at least one depression 32 on its inner side 20. The resonance chamber 17 is formed in this depression 32. As can likewise be seen in FIGS. 2 and 9, the adsorber element 16 can be arranged in a deep, preferably sunk manner in the said depression 32, in such a manner that the adsorber element 16 is arranged radially flush with the axially adjacent inner side 20 of the tubular body 12.

In the embodiment shown in FIG. 2, it can also be seen that the adsorber element 16 in the depression 32 bears axially against an annular step 33 of the tubular body 12. The adsorber element 16 also bears axially against a stop element 34 axially opposite the said annular step 33, which stop element is a separate component from the adsorber element 16 and the tubular body 12. This stop element 34 is in particular an end-face end or an end-face end region of a tube 35, which is inserted coaxially into the tubular body 12.

The invention claimed is:

1. A fresh air line for a fresh air system, comprising:
   a tubular body enclosing a fresh air path in a circumferential direction,
   at least one annular adsorber element arranged coaxially in the tubular body, and at least one resonance chamber arranged radially between the tubular body and the adsorber element, wherein the at least one annular adsorber element has at least one projection projecting from an outer side of the at least one annular adsorber element into the at least one resonance chamber, and further has at least one passage opening through the outer side and at least one projection communicatively connecting the fresh air path to the at least one resonance chamber.

2. The fresh air line according to claim 1, further comprising a plurality of resonance chambers are bound to each other at least one of axially and in the circumferential direction.

3. The fresh air line according to claim 2, wherein the resonance chambers are communicatively connected to the fresh air path via a plurality of passage openings.

4. The fresh air line according to claim 3, wherein each resonance chamber includes one passage opening.

5. The fresh air line according to claim 3, wherein at least two resonance chambers are adjacent in the circumferential direction and are separated by a radial dividing ridge.

6. The fresh air line according to claim 5, wherein the adsorber element includes an annular cage carrying an adsorber material.

7. The fresh air line according to claim 6, wherein at least one dividing ridge is integrally formed on the cage.

8. The fresh air line according to claim 6, wherein the cage includes an annular perforated wall having holes.

9. The fresh air line according to claim 8, wherein the passage openings align radially with the holes in the cage.

10. The fresh air line according to claim 1, wherein the tubular body includes at least one depression on an inner side, wherein the at least one resonance chamber is arranged in the at least one depression.

11. The fresh air line according to claim 10, wherein the at least one adsorber element is arranged at least one of deep and sunk radially flush with an axially adjacent inner side of the tubular body in the at least one depression.

12. The fresh air line according to claim 11, wherein the at least one adsorber element in the at least one depression bears axially against an annular step of the tubular body and bears axially against a stop element disposed axially opposite the annular step.

13. The fresh air line according to claim 1, wherein the adsorber element includes an annular cage carrying an adsorber material.

14. The fresh air line according to claim 1, wherein the adsorber element includes an annular cage, the annular cage having an annular perforated wall with holes, wherein the at least one radial passage opening aligns radially with the holes of the annular cage.

15. The fresh air line according to claim 1, wherein the at least one projection has a radial distance greater than a radial wall thickness of the at least one annular adsorber element.

16. A fresh air line for a fresh air system, comprising:
a tubular body enclosing a fresh air path in a circumferential direction,
at least one annular adsorber element arranged coaxially in the tubular body, and
a plurality of resonance chambers arranged radially between the tubular body and the adsorber element, the plurality of resonance chambers bound to each other at least one of axially and in the circumferential direction,
wherein the resonance chambers are communicatively connected to the fresh air path via passage openings,
wherein at least two of the resonance chambers are adjacent in the circumferential direction and are separated by a radial dividing ridge, and
wherein at least one dividing ridge includes at least one connection opening, the at least one connection opening communicatively connecting the at least two resonance chambers bordering the dividing ridge.

17. A fresh air system, comprising:
a fresh air tract having a fresh air filter and at least one fresh air line, the fresh air tract being connectable to combustion chambers of an internal combustion machine to supply fresh air to the combustion chambers, the at least one fresh air line including:
a tubular body enclosing a fresh air path in a circumferential direction;
at least one annular adsorber element arranged coaxially in the tubular body; and
at least two resonance chambers formed radially between the tubular body and the adsorber element, the at least two resonance chambers being separated by at least one dividing ridge defining at least one connection opening communicatively connecting the at least two resonance chambers.

18. The fresh air system according to claim 17, wherein the adsorber element includes at least one radial passage opening communicatively connecting the fresh air path to the at least one resonance chamber.

19. The fresh air system according to claim 18, wherein the adsorber element includes an annular cage carrying an adsorber material.

20. The fresh air system according to claim 17, further comprising a plurality of resonance chambers communicatively connected to the fresh air path via at least one radial passage opening, wherein at least two resonance chambers are adjacent in the circumferential direction and are separated by a radial dividing ridge.

* * * * *